May 8, 1934. G. H. HUFFERD 1,957,781
JOINT
Filed Aug. 10, 1933
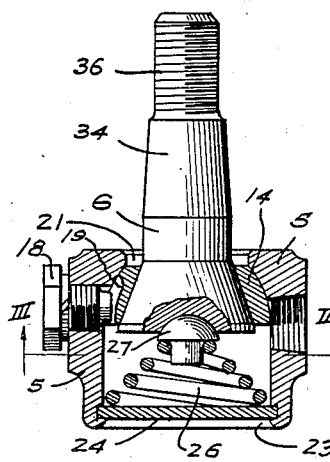
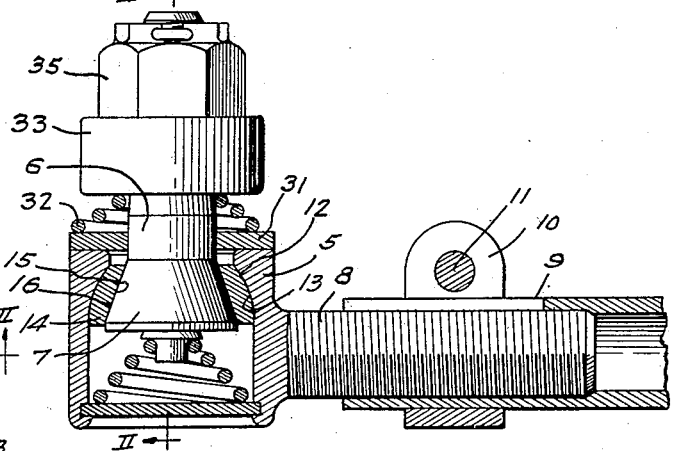
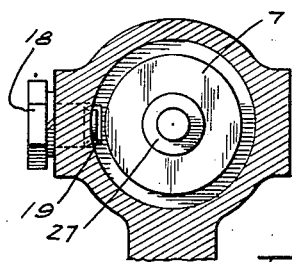
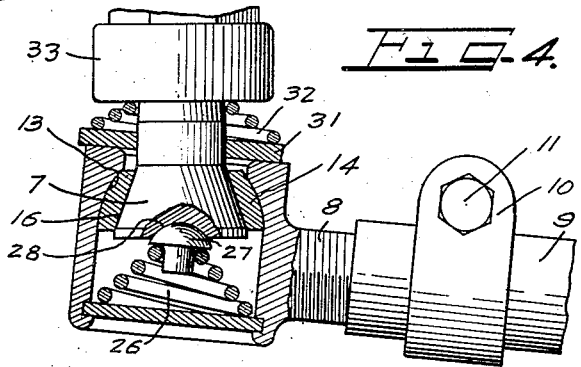
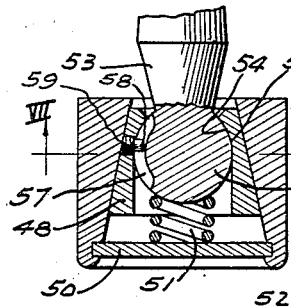
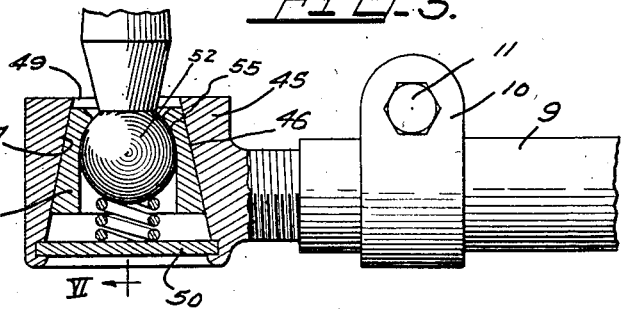
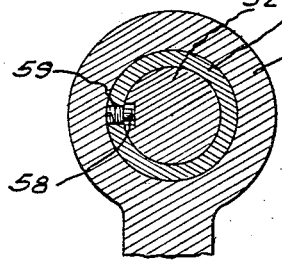
Inventor
George H. Hufferd.

Patented May 8, 1934

1,957,781

UNITED STATES PATENT OFFICE 1,957,781

JOINT

George H. Hufferd, Detroit, Mich., assignor to Thompson Products, Incorporated, Cleveland, Ohio, a corporation of Ohio Application August 10, 1933, Serial No. 684,523

9 Claims. (Cl. 287—90)

This invention relates to joints and will be described as incorporated in a tie rod connection for steering mechanism of an automotive vehicle. An object of this invention is the provision of an improved joint of the class identified which is adapted to permit a relatively high degree of tilting and rotary movement resulting in a limited universal movement between the tie rod housing and the stud cooperating therewith, and which is so designed and constructed that the bearing parts remain constantly in snug engagement.

Another object of this invention is the provision of a tie rod socket or joint which is particularly adapted for use with automotive vehicles in which the front wheels of the vehicle are independently mounted and consequently have a high degree of non-uniform movement, requiring considerable freedom in the tie rod joint.

Another object is the provision of such a joint which is substantially troubleproof, being automatically self-adjusting to compensate for wear of the engaging parts and in which the parts are so shaped and assembled, that lost motion or rattling is effectively prevented.

Other objects and advantages of this invention will become apparent to those skilled in the art from the following detailed description of the accompanying drawing illustrating preferred embodiments of my invention.

On the drawing:

Figure 1 is a longitudinal vertical section through an assembled joint incorporating this invention and illustrating portions thereof in elevation.

Figure 2 is a section taken on substantially the line II—II of Figure 1 with a portion of the stud broken away and the remainder of the stud shown in elevation.

Figure 3 is a section taken on the line III—III of Figure 2.

Figure 4 is a section similar to Figure 1 but showing a portion of the tie rod in elevation and illustrating the housing disposed at an angle relative to its normal position with respect to the stud, and showing a portion of the stud broken away to better disclose the relative positions of the parts.

Figure 5 is a vertical section through a modified form of joint incorporating this invention and illustrating certain of the parts in elevation.

Figure 6 is a vertical section taken on the line VI—VI of Figure 5 and showing a portion of the stud in elevation.

Figure 7 is a horizontal section taken on the line VII—VII of Figure 6.

As shown on the drawing:

The joint illustrated in Figures 1 to 4 inclusive comprises a housing member 5 and a stud 6 including a head portion 7 disposed for limited universal movement relative to the housing member. The housing member 5 includes a threaded connecting portion 8 adapted for threaded engagement with a tie rod 9 which has disposed thereabout a clamp 10 fixed in position by a bolt 11. The housing 5 is provided with a segmental spherical bearing surface 12 engageable with a segmental spherical bearing surface 13 on the ring-like seat element 14 which is disposed between the inner surface 12 of the housing and the outer surface 15 of the stud. The surface of the stud as indicated at 15 is frusto-conical and is adapted for snug engagement in cooperation with the inner surface 16 of the seat element 14, which is of the same design. This construction results in the provision of two pairs of concentrically disposed cooperating bearing surfaces, the outer pair of surfaces represented by numerals 12 and 13, provide for tilting movement of the stud relative to the housing whereas the inner pair of surfaces represented by numerals 15 and 16, provide for rotary movement of the stud relative to the housing. Rotary movement of the seat element 14 about the vertical axis of the stud 6 is prevented by means of a set screw 18 which extends through the housing 5 as indicated in Figures 2 and 3, and projects into a slot 19 in one edge of the seat element. The slot 19 is of a dimension to permit tilting movement of the seat member within the housing 5, without producing a binding effect upon the stud.

As the upper end of the housing 5 is provided with an opening 21, of smaller diameter than the head of the stud, it is necessary that the stud be inserted from the bottom of the housing through the opening 23, which is subsequently closed by the plate 24.

The stud 6 is securely held in position and the cooperating bearing surfaces are constantly maintained in engaging relation, by a spring 26 resting on the plate 24 and yieldingly urging a button 27 which is semi-spherical on its upper side into a semi-spherical recess 28 in the lower end of the stud 6. This construction not only urges the parts into cooperative relation but serves to yieldingly urge the stud toward a position at right angles to the tie rod 9.

The upper end of the housing 5 is closed by a washer 31 which serves as a support for a spring 32, the upper end of which is engageable under a member 33 which is fitted and secured on the tapered portion 34 of the stud by a nut 35 on the threaded portion 36. The spring 32 serves to assist the spring 26 in its function of urging upwardly on the stud 6, and it serves the additional function of maintaining the washer 31 in firm contact with the upper surface of the housing as the stud moves relative to the housing, and prevents rattling of the relatively movable parts.

In the modification of this invention is illustrated in Figures 5, 6 and 7, the housing designated by numeral 45 is provided with a frusto-conical inner surface 46 which has cooperative engagement with the outer frusto-conical surface 47 of the seat element 48, disposed therein. The seat element 48 is of larger diameter, than the opening 49 at the upper end of the housing and must be inserted through the lower end of the housing which is subsequently closed by the plate 50. The plate 50 provides a support for a coil spring 51 which constantly urges upwardly on the ball end 52 of the stud 53, and urges the bearing surface 54 of the ball end 52 into firm engagement with the inner segmental spherical surface 55 of the seat element 48, thereby providing for rotary movement of the seat element relative to the housing and tilting movement of the stud relative to the seat element. The head 52 of the stud is provided with a recess 57, into which projects the end portion 58 of a setscrew 59 which has threaded engagement in the wall of the seat element 48, to prevent relative rotary movement between the stud and the seat element.

One of the principal advantages of the construction above described is that it enables the degree of frictional resistance to turning or rotary movement to be varied independently of the resistance to tilting movement. This is accomplished by varying the angularity of the frusto-conical surfaces with respect to the axis of the housing bore or stud. As is evident, if the angle is increased so as to give a greater angle of taper or of divergency, the component of the force exerted by the spring 26 or 51 tending to urge the frusto-conical bearing surfaces together is greater than when said surfaces approach cylindrical surfaces. On the other hand, the frictional resistance to rotary movement between the segmental spherical bearing surfaces is not changed by altering the angle of taper of the other bearing surfaces.

Where the front wheels of an automobile are independently slung and each wheel has its individual tie rod, it is necessary to provide a wider range of freedom of tilting movement between the stud and tie rod than was the case formerly, without, however, interfering with the ease of turning movement. This provision can be readily made where joints embodying my invention are used, since separate coacting bearing surfaces are provided for the rotary and for the tilting movements, respectively. Heretofore, where ball joints have been used, the same sets of bearing surfaces took care of both types of relative movement and therefore, no independent adjustment of the degrees of frictional resistance to the two movements was possible.

From the foregoing description, it will be appreciated by those skilled in the art that this invention is susceptible of various forms and modifications without departing from the principle thereof, and it is accordingly desired that the patent to be granted hereon shall not be restricted in any manner except as necessitated by the prior art, and the scope of the appended claims.

I claim as my invention:

1. In a joint, a housing having a bearing surface therein, a stud freely rotatable about its own axis and universally tiltable with respect to the housing having a bearing surface disposed in the housing, a seat element interposed between said stud and housing having an outside bearing surface cooperating with the housing bearing surface and an inside bearing surface cooperating with the stud bearing surface, said sets of cooperating bearing surfaces converging in the same general direction and means urging said sets of bearing surfaces in the direction of convergence to maintain proper bearing relation of the cooperating surfaces, one of said pairs of cooperating bearing surfaces accommodating universal tilting movement of the stud and the other pair accommodating rotation of the stud about its own axis.

2. In a joint, a housing having a bearing surface therein, a stud freely rotatable about its own axis and universally tiltable with respect to the housing having a bearing surface disposed in the housing, a seat element interposed between said stud and housing having an outside bearing surface cooperating with the housing bearing surface and an inside bearing surface cooperating with the stud bearing surface, said sets of cooperating bearing surfaces converging in the same general direction, means urging said sets of bearing surfaces in the direction of convergence to maintain proper bearing relation of the cooperating surfaces, and means for locking the seat element to prevent both tilting and rotating movements from being borne by one set of bearing surfaces.

3. In a joint, a housing having a segmental spherical bearing surface therein, a seating element having a segmental spherical outside bearing surface and an inside surface of revolution of varying dimensions, said outside bearing surface cooperating with the bearing surface of the housing, a stud extending through said seating element and having a bearing surface of revolution cooperating with the inner bearing surface of said seating element, said stud being freely rotatable about its own axis and universally tiltable with respect to the housing, said rotatable movements being borne by the surfaces of revolution and said tilting movements being borne by the segmental spherical bearing surfaces, and resilient means for urging the cooperating sets of bearing surfaces into constant bearing relation.

4. In a joint, a housing having a segmental inside bearing surface of revolution of varying dimensions, a seating element in said housing rotatable on said bearing surface and having an inside segmental spherical bearing surface, a stud extending through said seating element having a spherical bearing end thereon cooperating with the segmental spherical bearing surface of said seating element, said stud being freely rotatable and universally tiltable with respect to the housing, said rotatable movements being borne by the cooperating surfaces of revolution and said tilting movements being borne by the cooperating spherical surfaces.

5. A joint comprising a socket member having a segmental spherical bearing surface therein, a one-piece seating element having an outside segmental spherical bearing surface cooperating with said housing bearing surface and an inside bearing surface of varying dimensions, a stud extending through said seating element having a bearing surface of varying dimensions cooperating with the inside surface of said seating element, means for locking said seating element against rotation with the stud about its own axis, and resiliently urged means for maintaining each set of bearing surfaces in constant bearing relation.

6. A joint comprising a socket member having an internal bearing surface, a stud member disposed in the socket member and having an external bearing surface, a seating element interposed between said members and having an external and an internal bearing surface to provide two concentric pairs of cooperating bearing surfaces, the surfaces of one pair being segmental spherical in form to afford universal tilting movement of the stud member relative to the housing and the surfaces of the other pair providing free rotary movement of the stud about its own axis, and resilient means urging the cooperating pairs of bearing surfaces into constant bearing relation.

7. A joint comprising a socket member having an inside segmental spherical bearing surface, a seating element having an outside segmental spherical bearing surface cooperating with said socket bearing surface and an inside frusto-conical bearing surface, a stud extending through said seating element and having a frusto-conical bearing surface cooperating with the inside surface of said element, means for locking said seating element against rotation with the stud about its own axis without interfering with tilting movements of the seating element relative to the housing, and spring urged means contacting the end of said stud for maintaining the elements of the joint in bearing relation.

8. A joint comprising a socket member having a frusto-conical inside bearing surface, a seating element having an outside frusto-conical bearing surface cooperating with said socket bearing surface and having a segmental spherical inside bearing surface, a stud extending through said seating element and having a spherical bearing end thereon cooperating with the inside bearing surface of the seating element, means for locking the spherical bearing end of the stud against rotation relative to the seating element without preventing tilting of the stud relative to the seating element, and spring means for maintaining the cooperating pairs of bearing surfaces in constant bearing relation.

9. A joint comprising a housing having a segmental spherical bearing surface therein, a seating element having an outside segmental spherical bearing surface cooperating with said housing bearing surface and having a frusto-conical inside bearing surface, a stud extending through said seating element and having a frusto-conical portion thereon cooperating with the inside bearing surface of said element, a rounded depressed portion in the end of said stud, a resiliently urged rounded button in said rounded depressed portion for maintaining the stud in constant bearing relation to the housing and locking means extending through the housing wall for preventing rotation of the seating element with respect to the housing about the axis of the stud.

GEORGE H. HUFFERD.